United States Patent
Fukushima

(10) Patent No.: US 7,457,528 B2
(45) Date of Patent: Nov. 25, 2008

(54) RECORDING/REPRODUCING APPARATUS

(75) Inventor: Nobuo Fukushima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 965 days.

(21) Appl. No.: 11/007,407

(22) Filed: Dec. 8, 2004

(65) Prior Publication Data

US 2005/0141875 A1 Jun. 30, 2005

(30) Foreign Application Priority Data

Dec. 15, 2003 (JP) ............................ 2003-417378

(51) Int. Cl.
*H04N 5/765* (2006.01)
(52) U.S. Cl. ................................. 386/117; 348/211.3
(58) Field of Classification Search ......... 386/117–120, 386/83; 348/143, 211.99, 211.1–211.14
See application file for complete search history.

(56) References Cited

U.S. PATENT DOCUMENTS

| | | | | |
|---|---|---|---|---|
| 4,731,677 A | * | 3/1988 | Mino et al. | 360/60 |
| 6,480,671 B2 | * | 11/2002 | Takahashi et al. | 386/117 |
| 2003/0169338 A1 | * | 9/2003 | Bergen et al. | 348/159 |

* cited by examiner

*Primary Examiner*—David E Harvey
(74) *Attorney, Agent, or Firm*—Canon U.S.A. Inc., I.P. Division

(57) ABSTRACT

A recording/reproducing apparatus has a network mode for transmitting and receiving image data through a network and a normal mode for recording and reproducing image data without connecting to a network. In a mode capable of switching between the network mode and the normal mode, the apparatus prohibits the data recording operation on a recording medium and the data erasing operation on the recording medium regardless of whether an accidental-recording prevention means is in a recording-allowed state or in a recording-prohibited state.

8 Claims, 8 Drawing Sheets

FIG. 7

TABLE 1  LEVEL 1

| NUMBER | SWITCH STATE | | | | OPERATION AND DISPLAY | |
|---|---|---|---|---|---|---|
| | NET | CARD/TAPE | WP | REC/PLAY/DEL | OPERATION | DISPLAY |
| 1 | NET | CARD | WP | PLAY | CARD REPRODUCTION OPERATION | |
| 2 | NORMAL | CARD | WP | PLAY | CARD REPRODUCTION OPERATION | |
| 3 | NET | CARD | NON-WP | PLAY | CARD REPRODUCTION OPERATION | |
| 4 | NORMAL | CARD | NON-WP | PLAY | CARD REPRODUCTION OPERATION | |
| 5 | NET | TAPE | WP | PLAY | TAPE REPRODUCTION OPERATION | |
| 6 | NORMAL | TAPE | WP | PLAY | TAPE REPRODUCTION OPERATION | |
| 7 | NET | TAPE | NON-WP | PLAY | TAPE REPRODUCTION OPERATION | |
| 8 | NORMAL | TAPE | NON-WP | PLAY | TAPE REPRODUCTION OPERATION | |
| 9 | NET | CARD | WP | DEL | DISPLAY -> | CANNOT ERASE FROM NETWORK OR WP |
| 10 | NORMAL | CARD | WP | DEL | DISPLAY -> | CANNOT ERASE BECAUSE OF WP |
| 11 | NET | CARD | WP | REC | DISPLAY -> | CANNOT RECORD BECAUSE OF WP |
| 12 | NORMAL | CARD | WP | REC | DISPLAY -> | CANNOT RECORD BECAUSE OF WP |
| 13 | NET | TAPE | WP | DEL | DISPLAY -> | CANNOT ERASE FROM NETWORK OR WP |
| 14 | NORMAL | TAPE | WP | DEL | DISPLAY -> | CANNOT ERASE BECAUSE OF WP |
| 15 | NET | TAPE | WP | REC | DISPLAY -> | CANNOT RECORD FROM NETWORK OR WP |
| 16 | NORMAL | TAPE | WP | REC | DISPLAY -> | CANNOT RECORD BECAUSE OF WP |
| 17 | NORMAL | CARD | NON-WP | DEL | DISPLAY -> | CANNOT ERASE IN NETWORK MODE |
| 18※ | NET | CARD | NON-WP | REC | DISPLAY -> | CANNOT RECORD IN NETWORK MODE |
| 19 | NET | TAPE | NON-WP | REC | DISPLAY -> | CANNOT RECORD IN NETWORK MODE |
| 20 | NORMAL | CARD | NON-WP | DEL | CARD ERASURE OPERATION | |
| 21 | NORMAL | CARD | NON-WP | REC | CARD RECORDING OPERATION | |
| 22 | NORMAL | TAPE | NON-WP | REC | TAPE RECORDING OPERATION | |

FIG. 8

TABLE 2   LEVEL 2

| NUMBER | SWITCH STATE | | | | OPERATION AND DISPLAY | |
|---|---|---|---|---|---|---|
| | NET | CARD/TAPE | WP | REC/PLAY/DEL | OPERATION | DISPLAY |
| 1 | NET | CARD | WP | PLAY | CARD REPRODUCTION OPERATION | |
| 2 | NORMAL | CARD | WP | PLAY | CARD REPRODUCTION OPERATION | |
| 3 | NET | CARD | NON-WP | PLAY | CARD REPRODUCTION OPERATION | |
| 4 | NORMAL | CARD | NON-WP | PLAY | CARD REPRODUCTION OPERATION | |
| 5 | NET | TAPE | WP | PLAY | TAPE REPRODUCTION OPERATION | |
| 6 | NORMAL | TAPE | WP | PLAY | TAPE REPRODUCTION OPERATION | |
| 7 | NET | TAPE | NON-WP | PLAY | TAPE REPRODUCTION OPERATION | |
| 8 | NORMAL | TAPE | NON-WP | PLAY | TAPE REPRODUCTION OPERATION | |
| 9 | NET | CARD | WP | DEL | DISPLAY | CANNOT ERASE FROM NETWORK OR WP |
| 10 | NORMAL | CARD | WP | DEL | DISPLAY | CANNOT ERASE BECAUSE OF WP |
| 11 | NET | CARD | WP | REC | DISPLAY | CANNOT RECORD BECAUSE OF WP |
| 12 | NORMAL | CARD | WP | REC | DISPLAY | CANNOT RECORD BECAUSE OF WP |
| 13 | NET | TAPE | WP | DEL | DISPLAY | CANNOT ERASE FROM NETWORK OR WP |
| 14 | NORMAL | TAPE | WP | DEL | DISPLAY | CANNOT ERASE BECAUSE OF WP |
| 15 | NET | TAPE | WP | REC | DISPLAY | CANNOT RECORD IN NETWORK MODE |
| 16 | NORMAL | TAPE | WP | REC | DISPLAY | CANNOT RECORD BECAUSE OF WP |
| 17 | NET | CARD | NON-WP | DEL | DISPLAY | CANNOT ERASE IN NETWORK MODE |
| 18 | NET | CARD | NON-WP | REC | CARD RECORDING OPERATION | |
| 19 | NET | TAPE | NON-WP | DEL | DISPLAY | CANNOT RECORD IN NETWORK MODE |
| 20 | NORMAL | CARD | NON-WP | DEL | CARD ERASURE OPERATION | |
| 21 | NORMAL | CARD | NON-WP | REC | CARD RECORDING OPERATION | |
| 22 | NORMAL | TAPE | NON-WP | REC | TAPE RECORDING OPERATION | |

FIG. 9

TABLE 3  LEVEL 3

| NUMBER | SWITCH STATE | | | | OPERATION AND DISPLAY | |
|---|---|---|---|---|---|---|
| | NET | CARD/TAPE | WP | REC/PLAY/DEL | OPERATION | DISPLAY |
| 1 | NET | CARD | WP | PLAY | CARD REPRODUCTION OPERATION | |
| 2 | NORMAL | CARD | WP | PLAY | CARD REPRODUCTION OPERATION | |
| 3 | NET | CARD | NON-WP | PLAY | CARD REPRODUCTION OPERATION | |
| 4 | NORMAL | CARD | NON-WP | PLAY | CARD REPRODUCTION OPERATION | |
| 5 | NET | TAPE | WP | PLAY | TAPE REPRODUCTION OPERATION | |
| 6 | NORMAL | TAPE | WP | PLAY | TAPE REPRODUCTION OPERATION | |
| 7 | NET | TAPE | NON-WP | PLAY | TAPE REPRODUCTION OPERATION | |
| 8 | NORMAL | TAPE | NON-WP | PLAY | TAPE REPRODUCTION OPERATION | |
| 9 | NET | CARD | WP | DEL | DISPLAY → | CANNOT ERASE FROM NETWORK OR WP |
| 10 | NORMAL | CARD | WP | DEL | DISPLAY → | CANNOT ERASE BECAUSE OF WP |
| 11 | NET | CARD | WP | REC | DISPLAY → | CANNOT RECORD BECAUSE OF WP |
| 12 | NORMAL | CARD | WP | REC | DISPLAY → | CANNOT RECORD BECAUSE OF WP |
| 13 | NET | TAPE | WP | DEL | DISPLAY → | CANNOT ERASE FROM NETWORK OR WP |
| 14 | NORMAL | TAPE | WP | DEL | DISPLAY → | CANNOT ERASE BECAUSE OF WP |
| 15 | NET | TAPE | WP | REC | DISPLAY → | CANNOT RECORD FROM NETWORK OR WP |
| 16 | NORMAL | TAPE | WP | REC | DISPLAY → | CANNOT RECORD BECAUSE OF WP |
| 17※ | NET | CARD | NON-WP | DEL | CARD ERASURE OPERATION | |
| 18 | NET | CARD | NON-WP | REC | CARD RECORDING OPERATION | |
| 19※ | NET | TAPE | NON-WP | REC | TAPE RECORDING OPERATION | |
| 20 | NORMAL | CARD | NON-WP | DEL | CARD ERASURE OPERATION | |
| 21 | NORMAL | CARD | NON-WP | REC | CARD RECORDING OPERATION | |
| 22 | NORMAL | TAPE | NON-WP | REC | TAPE RECORDING OPERATION | |

RECORDING/REPRODUCING APPARATUS

BACKGROUND OF THE INVENTION

1. Field of the Invention

The present invention relates to a recording/reproducing apparatus capable of transmitting data to a network such as the Internet, and more particularly to an apparatus, such as a video camera, a digital camera, etc., capable of recording images in a tape medium, a memory-card medium, or a disk medium, etc., for use by being connected to a network, and to a control method thereof.

2. Description of the Related Art

Up to now, in a video camera for recording moving images into a recording medium such as a tape, etc., the video camera is capable of transmitting and receiving image data to another terminal on a network such as the Internet directly from the video camera or via a personal computer.

Also, the video camera can be remotely operated from another terminal on a network. For example, FIG. 6 shows a state in which a video camera is connected to a network. Reference numeral 1 denotes a video camera main unit, reference numeral 2 denotes a terminal such as a personal computer, reference numeral 3 denotes a network, and reference numeral 4 denotes a terminal on the network. In this network mode, a situation in which the video camera main unit 1 is operated from the terminal 4 is assumed.

Incidentally, an image recorded on a tape in a video camera, etc., might be overwritten by other images or erased by the operation of another terminal connected to the network.

In order to prevent this, a cassette containing a recording medium tape usually has an accidental-erasure-prevention tab. By setting the tab to an accidental-erasure-prohibited position, overwrite and erasure by mistake are prevented.

However, in the accidental-erasure-prohibited state, recording and erasure become impossible not only by a remote operation, but also by the video camera main unit, and thus it is necessary for the user to set the cassette to an accidental-erasure-prohibited state only when connected to a network. This is very troublesome for the user, and the user sometimes undesirably connects the video camera to a network while neglecting to set the cassette to the accidental-erasure-prohibited state.

SUMMARY OF THE INVENTION

Accordingly, the present invention has been made in view of such a problem. The present invention provides a recording/reproducing apparatus capable of preventing data from being overwritten while the operator is unaware, and protecting important data.

In order to solve the above-described problem, according to the present invention, there is disclosed a recording/reproducing apparatus using a recording medium having accidental-recording prevention means capable of setting the medium to a recording-allowed state allowing recording or erasing and a recording-prohibited state prohibiting recording or erasing in order to prevent accidental recording or accidental erasure. The apparatus includes: recording/reproducing means for recording, reproducing, or erasing of data on the recording medium; switching means capable of switching between a network mode for transmitting and receiving image data through a network and a normal mode for recording and reproducing image data without connecting to a network; and control means for controlling the recording operation and erasing operation on the recording medium in accordance with the setting of the accidental-recording prevention means in the normal mode, and for prohibiting the recording operation on the recording medium and erasing operation on the recording medium regardless of whether the accidental-recording prevention means is in the recording-allowed state or the recording-prohibited state in the network mode.

Further purposes, features and advantages of the present invention will become apparent from the following description of the embodiments with reference to the attached drawings.

BRIEF DESCRIPTION OF THE DRAWINGS

FIG. 7 shows level 1 operation level.

FIG. 8 shows level 2 operation level.

FIG. 9 shows level 3 operation level.

DESCRIPTION OF THE EMBODIMENTS

In the following, a description will be given of embodiments of the present invention.

First Embodiment

A description will be given of a first embodiment of the present invention based on the drawings. Here, in the following, a description will be given of an example in which the present invention is applied to a digital video camera capable of recording, reproducing, or erasing data on a tape medium and a memory card medium.

Figure 1:
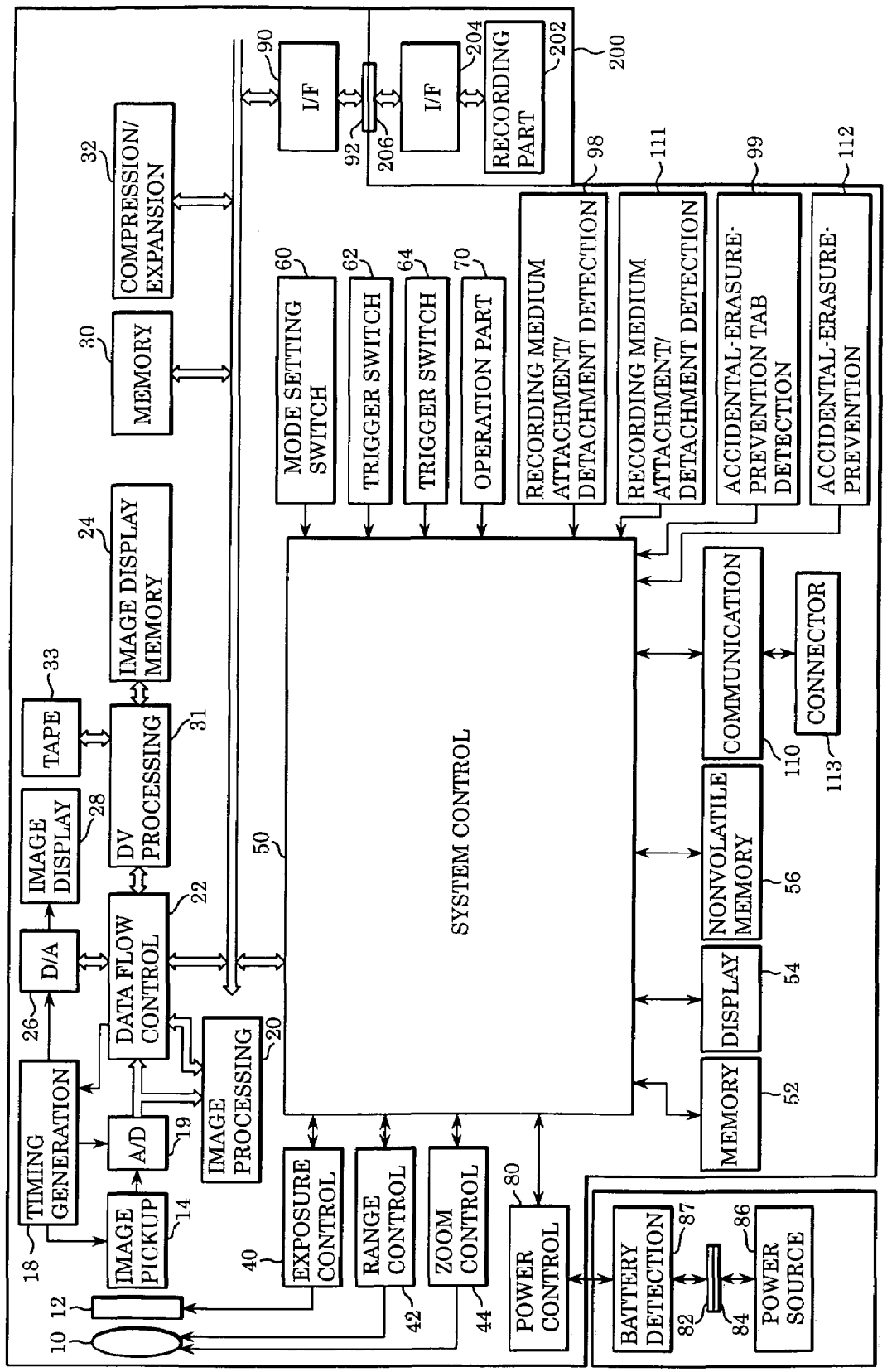
FIG. 1 is a configuration diagram of a digital video camera according to the present invention.

FIG. 1 is a diagram illustrating the configuration of an image processing apparatus 100. The exemplary image processing apparatus 100 shown in FIG. 1 is a digital video camera.

Reference numeral 10 denotes a capturing lens, reference numeral 12 denotes an exposure control member such as an aperture, a shutter, etc., reference numeral 14 denotes an image-pickup device for converting an optical image into an electrical signal, reference numeral 16 denotes an A/D converter for converting an analog signal output from the image-pickup device 14 into a digital signal, and reference numeral 18 denotes a timing generation circuit for supplying a clock signal and a control signal to the image-pickup device 14, the A/D converter 16, and a D/A converter 26. The timing generation circuit 18 is controlled by a memory control circuit 22 and a system control circuit 50.

Reference numeral 20 denotes an image processing circuit, which performs predetermined pixel-interpolation processing or color-conversion processing on the data from the A/D converter 16 or the memory control circuit 22. Also, the image processing circuit 20 performs calculation processing for light exposure control and range control based on image data.

Reference numeral 22 denotes a data-flow control circuit, which controls data input/output among the A/D converter 16, the timing generation circuit 18, the image processing circuit 20, an image display memory 24, the D/A converter 26, a memory 30, a compression/expansion circuit 32, etc.

At shooting and recording time, the data from the A/D converter 16 is written into the image display memory 24 or the memory 30 through the image processing circuit 20 and the memory control circuit 22 or directly through the memory control circuit 22.

Reference numeral 24 denotes the image display memory, reference numeral 26 denotes the D/A converter. Reference numeral 28 denotes a TFT LCD (TFT Liquid crystal display) unit. The image data written into the image display memory 24 is displayed on the image display unit 28 through the D/A converter 26. By displaying the image data captured one after another using the image display unit 28, it is possible to achieve an electronic finder function.

Reference numeral 30 denotes the memory for storing captured still images or moving images. The memory 30 has a sufficient storage capacity for temporarily storing images in order to process predetermined still image and to process moving images for a predetermined time period. Also, the memory 30 can be used for a working area of the system control circuit 50.

Reference numeral 32 denotes a compression/expansion circuit for compressing and expanding image data. The compression/expansion circuit 32 reads the images stored in the memory 30, performs compression processing or expansion processing on the images, and writes the processed data into the memory 30.

Reference numeral 31 denotes a processing circuit for recording data onto a tape. The processing circuit converts the signal so as to conform to the digital video (DV) format, for example, it adds information and the like.

Reference numeral 33 denotes a recording medium such as a tape. The recording medium 33 is controlled appropriately by unillustrated control drive means which controls the running of the tape and the rotation of a tape drum, and performs recording and reproducing of image data.

Reference numeral 40 denotes exposure control means for controlling an exposure control member 12 such as an aperture, a shutter, etc. Reference numeral 42 denotes a range control means for controlling focusing of the capturing lens 10. Reference numeral 44 denotes zoom control means for controlling zooming of the capturing lens 10.

The exposure control means 40 and the range control means 42 are controlled using a TTL method. The system control circuit 50 performs control of the exposure control means 40 and the range control means 42 based on the calculation result obtained by calculating the image data captured by the image processing circuit 20.

Reference numeral 50 denotes a system control circuit for controlling the entire image processing apparatus 100. Reference numeral 52 denotes a memory, such as a flash ROM, for storing constants, variables, programs, etc., in order to operate the system control circuit 50.

Reference numeral 54 is a display unit, such as a liquid crystal display unit, a speaker, etc., for indicating the operation state, a message, etc., using characters, images, sound, etc., in accordance with the program execution of the system control circuit 50. One or a plurality of the display units 54 are disposed at an easily-viewed position near the operation part of the image processing apparatus 100. The display unit 54 includes, for example, a combination of an LCD, an LED, a sound production element, etc.

Reference numeral 56 denotes a nonvolatile memory capable of being electrically erased and recorded for storing various adjustment values: for example, an EEPROM, etc., is used.

Reference numerals 60, 62, 64, and 70 denote operation means for inputting various operation instructions of the system control circuit 50, which includes a single or a plurality of combinations of a switch, a dial, a touch panel, a pointing device using detection of a viewing line, and a sound recognition apparatus, etc.

Reference numeral 60 denotes a mode-setting switch member, which enables switching between individual functional modes such as power off, a shooting/recording mode, a reproducing mode, an erasing mode, a network connection mode, recording medium selection, etc.

Figure 2:
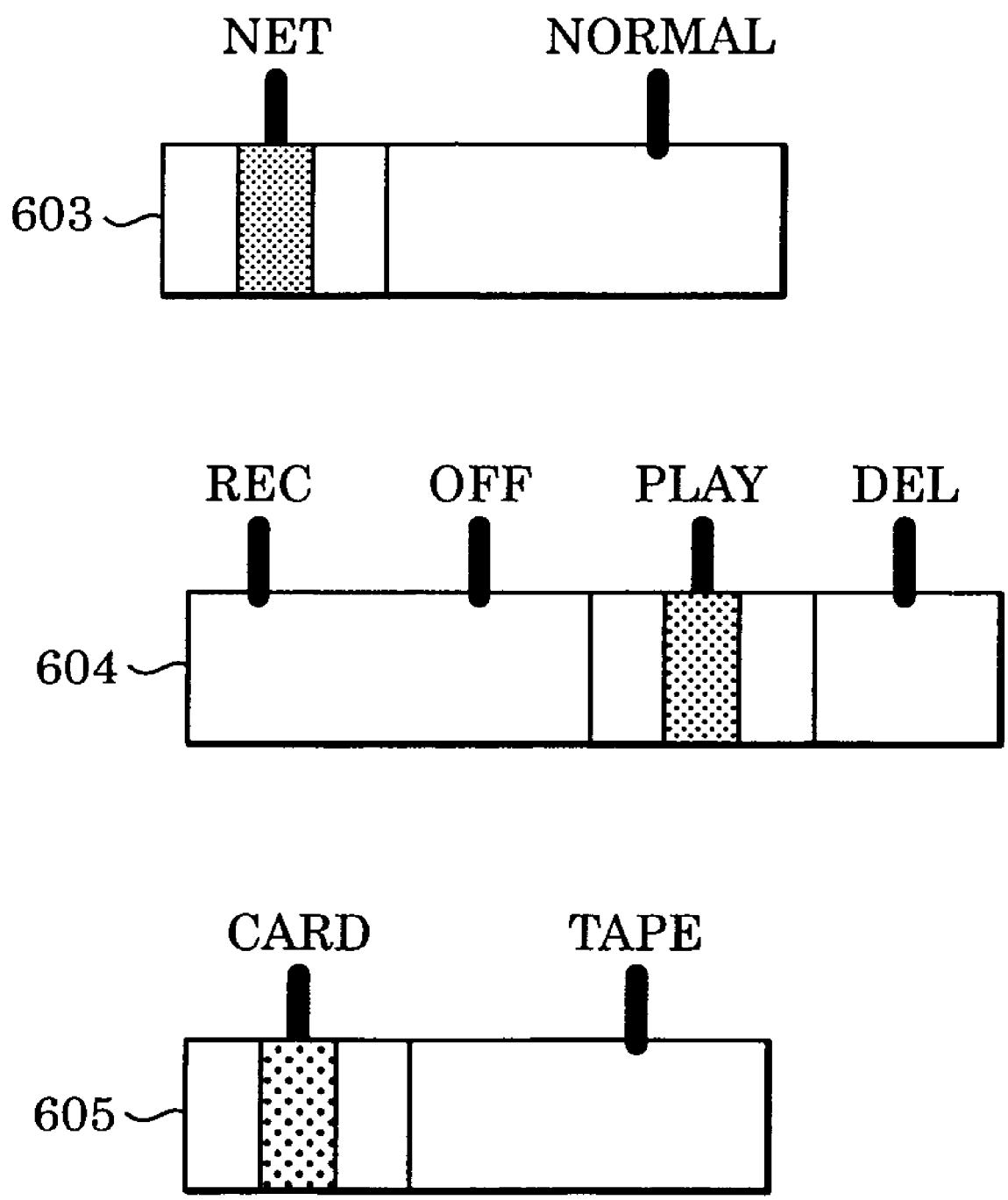
FIG. 2 is a detailed illustration of a mode-setting switch member according to the present invention.

As shown in FIG. 2, the mode setting switch 60 is provided with a network-mode setting switch 603 for selecting whether or not the camera is connected to a network, an operation-mode setting slide switch 604 for switching the shooting/recording mode, power off mode, the reproducing mode, and the erasing mode, and a recording-medium selection slide switch 605 for selecting a card or a tape.

Reference numeral 62 denotes a still-image shooting trigger switch. Reference numeral 64 denotes a moving-image shooting trigger switch. Reference numeral 70 denotes an operation part including various buttons, a touch panel, etc. The operation part 70 includes a zoom switch, a menu button, a set button, a menu movement + (plus) button, a menu movement − (minus) button, a reproducing image movement + (plus) button, a reproducing image movement − (minus) button, a captured image quality selection button, an exposure correction button, etc.

Reference numeral 80 denotes power control means, which includes a DC-DC converter, a switch circuit for switching blocks to which electricity is turned on, etc. The power control means 80 detects whether a battery is attached or not, what type of battery, and the remaining amount of the battery through battery detection means 87, controls the DC-DC converter based on the detection result and an instruction from the system control circuit 50, and supplies a necessary voltage to each part, including the recording medium, for a necessary time period. Reference numerals 82 and 84 denote the connectors. Reference numeral 86 denotes various kinds of power source means including a nonrechargeable primary battery such as an alkaline manganese battery, a rechargeable secondary battery such as a lithium-ion battery, and an AC-DC adapter, etc., for converting AC power into DC power to supply a direct current to the main unit.

Reference numeral 87 denotes battery detection means for determining the type of battery. For the determination method, for example, the shape of the battery may be mechanically determined. Further, the internal resistance of a battery is measured from a voltage difference between the time when a predetermined current flows and the time when no current flows, and thereby the type of battery and the consumption level can be determined. Furthermore, the battery itself may have communication means that informs the type of the battery, the consumption level, etc.

Reference numeral 90 denotes an interface with a recording medium such as a memory card. Reference numeral 92 denotes a connector for connecting to a recording medium such as a memory card, etc. Reference numeral 98 denotes a recording-medium attachment/detachment detection means for detecting whether or not the recording medium 20 is attached to the connector 92.

Reference numeral 99 denotes an accidental-erasure-prevention tab detection means for detecting the state of the accidental-erasure-prevention tab of the recording medium attached to the connector 92. Reference numeral 111 denotes a recording-medium attachment/detachment detection means for detecting whether or not the tape recording medium 33 is attached. Reference numeral 112 denotes accidental-erasure-prevention tab detection means for detecting the state of the accidental-erasure-prevention tab of the recording medium attached to the tape recording medium 33.

Reference numeral 110 denotes a USB communication controller. Reference numeral 113 denotes a USB terminal, which is a connector for connecting the image processing apparatus 100 to the other USB apparatuses by the communication means 110 using an unillustrated cable.

Reference numeral 200 denotes a replaceable recording medium such as a memory card, etc., or various I/O cards, which are assumed to be memory cards including a semiconductor memory, a magnetic disk, etc. Also, the recording medium has a connector 206 for connecting to the image processing apparatus 100 through the interface 204 for recording to a recording part 202.

Next, a description will be given of the differences in the recording method between a sequential-access medium, such as a tape, and a random access medium, such as a card or disk, with reference to FIGS. 3 and 4.

Figure 3A:
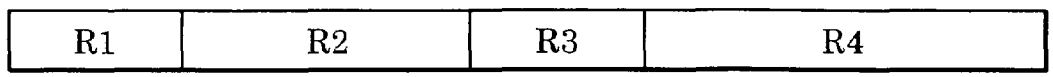
FIG. 3 is a diagram illustrating a recording state of a sequential-access recording medium.

FIG. 3 illustrates a recording state of a sequential-access recording medium such as a tape. Moving images are recorded on a tape in sequence. Suppose that the moving images are additionally recorded into three blocks each formed by dividing the images into a plurality of scenes at shooting time. In FIG. 3A, the first divided scene is recorded in an area R1. In the same manner, the second and the third scenes are recorded in the areas R2 and R3, respectively. The area R4 is empty and unrecorded.

Figure 3B:
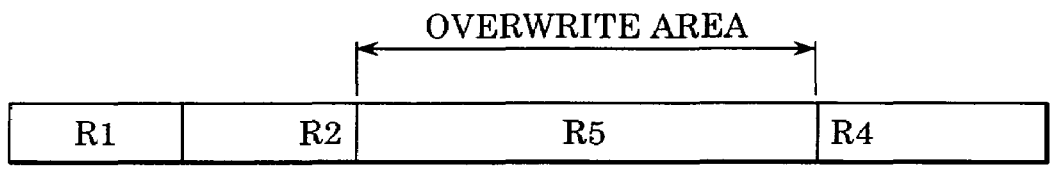

In the case of a tape medium, when recordings are newly added, the tape is fed in order for each divided scene not to overlap on the tape. However, it is possible to overwrite a recording on an already-recorded area. That is to say, a tape may be rewound after being recorded, and as shown in FIG. 3B, if the tape is played back until the middle of R2 and recording is started, then the recording is conducted on the area R5. In that case, the latter half of the area R2 in FIG. 3(a) and the area R3, which were previously recorded, are overwritten.

On the other hand, FIG. 4 illustrates a recording method in the case of a random-access medium such as a memory card.

FIG. 4 illustrates a recording area on a memory medium as a schematic image of a memory map. In FIG. 3, which is the case of the previous tape medium, the physical shape of the tape medium matches the recording areas, whereas in the case of a card, a recording area is managed by the address in the memory, and thus a recording area does not indicate a physical recording position in the actual memory. In reality, a recording area is not controlled by the address itself, but is controlled using a logically-provided area corresponding to a predetermined amount of data: that is, it is controlled by the concept of sectors and clusters.

Here, for the sake of simplicity of the description, the entire area is divided into smaller areas, each of which has 100 addresses.

Figure 4A:
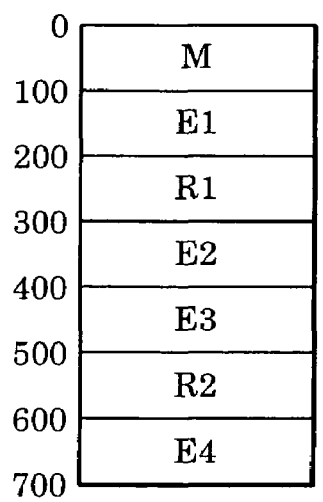
FIG. 4 is a diagram illustrating a recording mode of a random accessible medium.

First, in FIG. 4A, the area M (from address 0 to address 100), to which a code "M" is added, is a control area, and stores information indicating areas on which data is recorded in the memory. The areas E1, E2, E3, and E4, to which a code "E" is added, indicate unrecorded areas. The areas R1 and R2, to which a code "R" is added, indicate recorded areas.

Figure 4B:
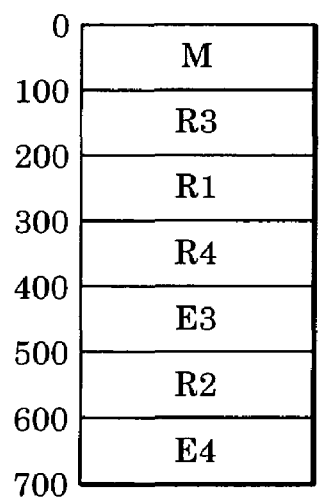

In the same manner as the previous tape medium, when the first cut scene is recorded, the scene is separately recorded in the empty areas E1 and E2 as shown in FIG. 4B. Here, the newly recorded areas are assumed to be referred to as areas R3 and R4. That is to say, the unrecorded areas E1 and E2 become recorded areas R3 and R4.

As described above, in the memory medium, data can be recorded at a random position in a memory map, and thus it is easy to find empty areas to record data. Accordingly, data can be recorded without being overwritten. Also, when recorded data becomes unnecessary, only that area can be erased.

Figure 4C:
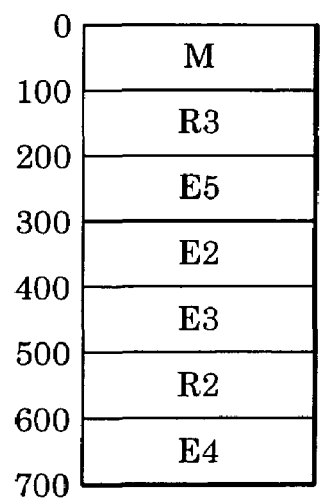

For example, if the data recorded in the area R1 in FIG. 4B becomes unnecessary, only that portion can be erased, or it is possible to make it a recordable area logically by registering the area as an unnecessary area location in the control area M. That is to say, after erasure, as shown in FIG. 4C, the area having addresses 200 to 300 is controlled as an unrecorded area (code E5).

In reality, the method used in a random-access medium (a semiconductor memory, a hard disk, or an optical disc) is not as simple as described above. However, for the sake of description, the outline has been described here.

Moreover, in a random-access medium, there are various other data control methods. The details of the control methods will be omitted here, because they can be achieved in embodiments of the present invention regardless of differences in detail.

Figure 5:
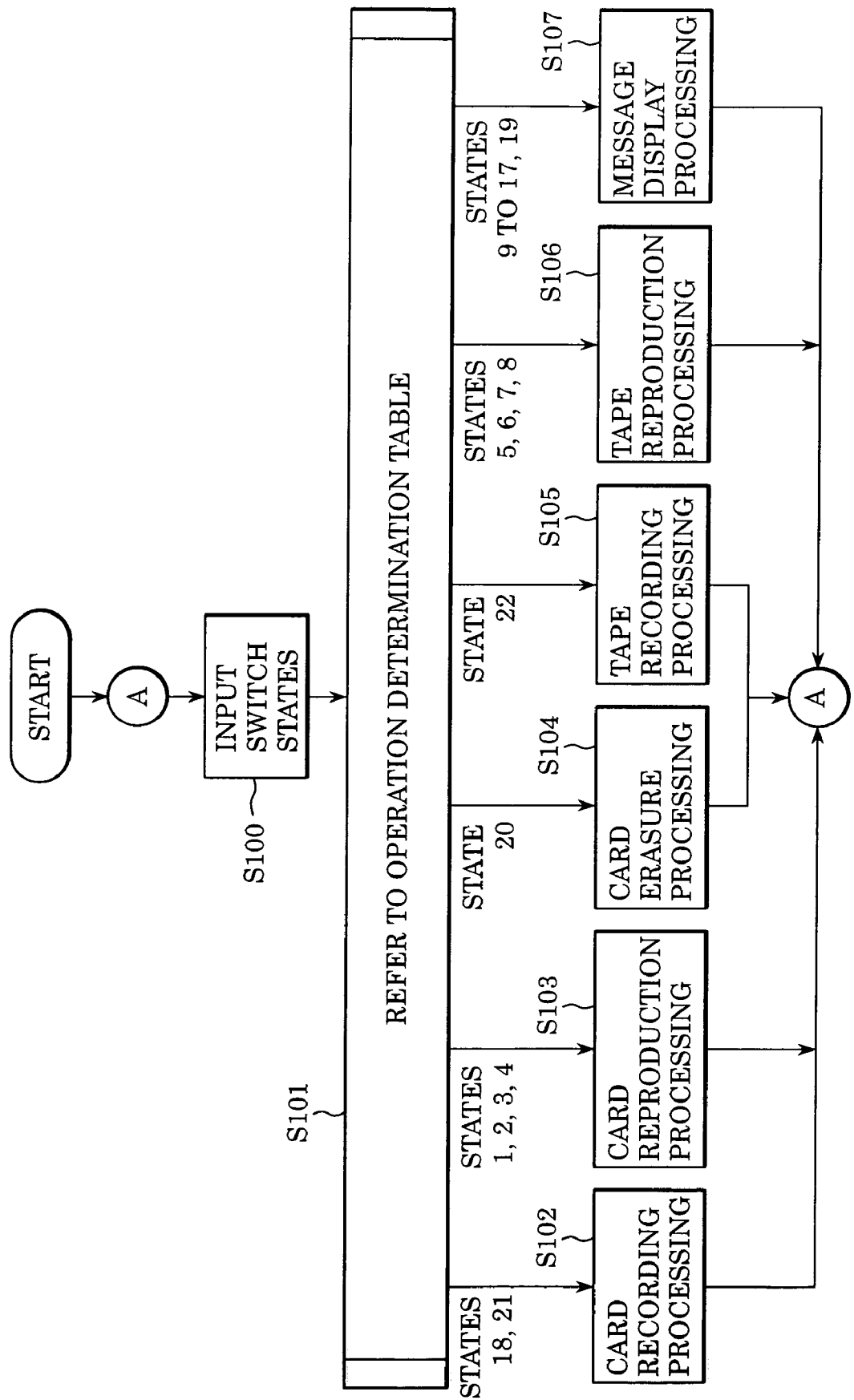
FIG. 5 is a flowchart illustrating the operation execution sequence.
Figure 6:
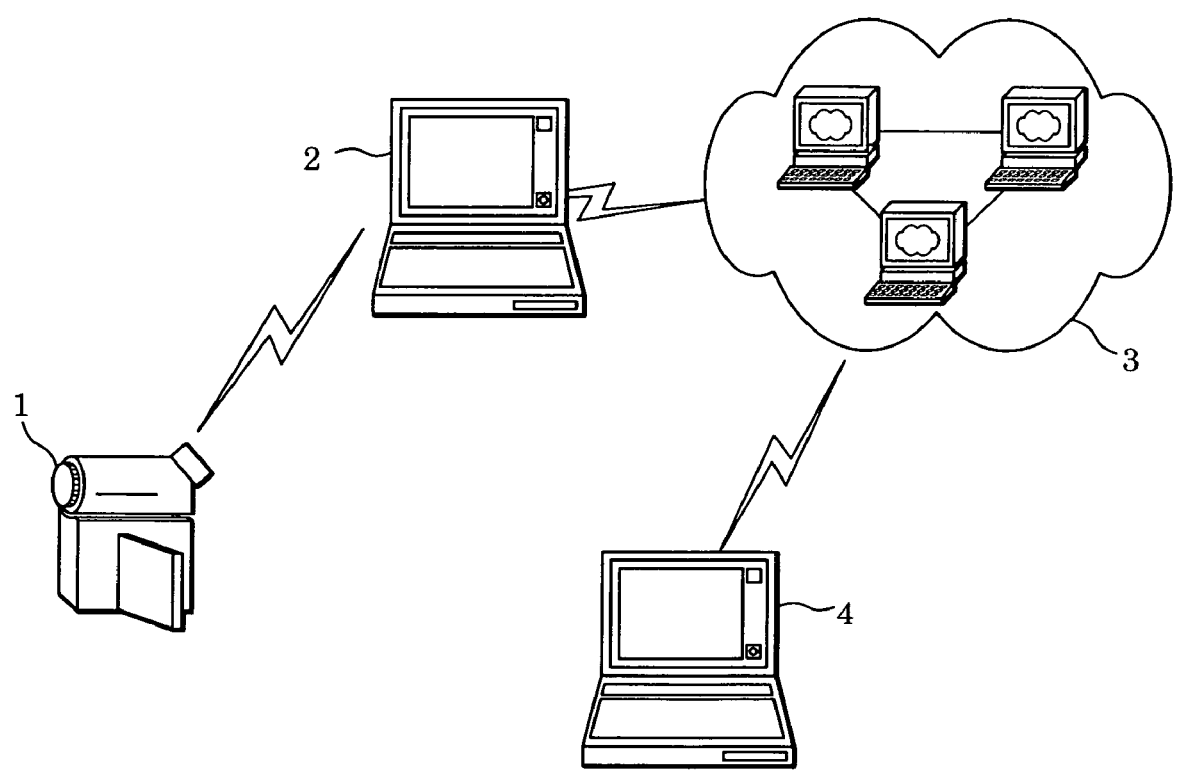
FIG. 6 is a configuration diagram illustrating the connection relation between a main unit, a network, and a terminal on the network.

Next, of the control of the main unit based on the flowchart in FIG. 5, a description will be given of the determination of operations, and the operation execution sequences after the determination. In this regard, in general, accidental-recording prevention means is referred to as accidental-erasure prevention means, a write-protection flag, an accidental-erasure prevention tab, or a write-protection key.

Here, a description will be given of the operation in which the operation mode set by the operator is determined, and the control is appropriately performed in accordance with that mode, the type of the recording medium, and the accidental-erasure prevention state.

Specifically, in the network mode, even if the medium is not in an accidental-erasure prevention state, in the case of a tape medium, recording and erasure are prohibited, and in the case of a card, erasure is prohibited.

Also, suppose that the operator has set the main-unit operation mode using the operation member in advance. That is to say, the main-unit operation is assumed to be set in a desired state. Specifically, whether the network mode or the NORMAL mode is set by the switch 603 (refer to FIG. 2), whether recording (REC), reproducing (PLAY), or erasure (DEL) is set by the switch 604, and whether the medium to be operated is a card or a tape is set by the switch 605. Also, the operation for recording and erasure is performed by an instruction from the main unit or the network. Here, in the normal mode, operation from the main unit is possible and operation from the network is restricted. In the network mode, operation from the main unit is restricted and operation from the network is possible.

First, in step S100, the states of the various switches and the accidental erasure-prevention state of the medium are read. In step S101, an appropriate operation is determined in accordance with the states of the various switches shown in Table 2 in FIG. 8. In Table 2, 22 possible states of each switch and the medium are considered.

Here, for the sake of convenience of the description, numbers 1 to 22 are given to each state. The operation and the display corresponding to the switch states 1 to 22 are indicated at the right side. The controller starts each operation in accordance with the table by referring to it.

Specifically, in the states 18 and 21, the processing enters step S102, the card recording operation. In the states 1, 2, 3, and 4, the processing enters step S103, the card reproducing operation. Also, in the state 20, the processing enters step S104, the card erasing operation. In the state 22, the processing enters step S105, the tape recording operation.

In the states 5, 6, 7, and 8, the processing enters step S106, the tape reproducing operation. In the states 9 to 17 and 19, each of the corresponding messages is displayed on the display part 28 (S107).

In the cases of the states 9, 11, 13, 15, 17, and 19, this message is sent to the terminal 4 on the network, and thus the terminal 4 on the network can determine the state of the main unit.

After executing the operation in any one of the steps S102, S103, S104, S105, S106, and S107, the processing goes back to the first step (A) again.

Accordingly, the determination of the main unit operation differs when the medium is not in an accidental-erasure prevention state, depending on whether the mode is in the network mode or the normal mode, and whether the medium is a card or a tape. Specifically, in the network mode, even if the recording medium is not in an accidental-erasure prevention state, in the case of a tape medium, recording and erasure are prohibited, and in the case of a card, erasure is prohibited.

Second Embodiment

Next, in the following, a description will be given of a second embodiment of the present invention. In the first embodiment described above, in the network mode, even if the recording medium is not in an accidental-erasure prevention state, in the case of a tape medium, recording and erasure are prohibited, and in the case of a card, erasure is prohibited.

However, there is concern that an operator may not understand the differences in operations depending on the medium. Thus, in the second embodiment, the setting can be made such that recording and erasure on the medium are all prohibited from a network.

That is to say, in the second embodiment, operation levels are provided for the prohibition control of recording and erasure, and the operator is allowed to select a level according to necessity.

For example, in level 1, in the network mode, recording and erasure are all prohibited regardless of whether the medium is a card or a tape.

In level 2, in the same manner as in the first embodiment, the processing is different depending on the medium in the network mode. That is to say, when the medium is a tape, recording is prohibited regardless of whether the accidental-recording prevention means is set to the prohibited state or the non-prohibited state. When the medium is a card, if the medium is in an accidental-recording prevention state, erasure is prohibited.

In level 3, the prohibition restriction in the network mode is removed, and it is possible to record and erase data in the non-accidental-erasure prevention state in the same manner as in the non-network mode. That is to say, when the medium is a tape, if the medium is in the non-accidental-erasure prevention state, recording and erasure are possible. When the medium is a card, if the medium is the non-accidental-erasure prevention state, recording and erasure are possible.

In this regard, even when the medium is protected in level 1, if a third person on the network changes the level to level 2 or level 3, there is a possibility that the recorded medium is erased as a result. Thus, it is considered to be necessary not to allow changing the level by the operation on the network.

Accordingly, for example, the operation for changing the levels should be possible only by the operation member of the main unit.

Level 1 is used as the initial state at product delivery time, immediately after turning on the power, or after reset. In this way, recording and erasure from the network are all prohibited, and thus this is the safest way in terms of medium protection. Also, this way is easy for the users to understand. On the other hand, for operators who truly understand the operation of the main unit and an operator operating on the network, the level should be set to level 2.

Such a level can be set by displaying a setting-menu screen on the main unit and by selecting the level using the operation member. The setup level is stored, and in the table reference in FIG. 5, the operation can be determined, for each level, in accordance with Table 1 for level 1 shown in FIG. 7, Table 2 for level 2 shown in FIG. 8, and Table 3 for level 3 shown in FIG. 9, respectively.

Third Embodiment

In the following, a description will be given of a third embodiment of the present invention. In the present embodiment, even in the network mode, recording and erasure are possible by the operation of the main unit.

In the embodiments described above, no distinction is made whether the operation instruction is from the network or is based on the operation member of the main unit. However, in the network mode, the operation from the network may be restricted, and the operation based on the operation member of the main unit may be accepted.

For the entire operation of the controller, it is possible to determine whether an instruction is an operation instruction based on the operation of the main unit or an operation from the network, and thus the operation can be performed by this determination.

The operation can be set in the setting screen. This is the same as the operation setting screen described above, and thus the description thereof is omitted.

In this regard, in the embodiments described above, a description has not been given of usual control such as prohibiting recording when the remaining free recording area is small. However, in a real implementation, the usual control should be performed as a matter of course. The present invention does not prevent that control operation.

Furthermore, in the embodiments described above, a description has been given using a tape and a card as recording media. However, in addition to a card, a disk medium may be used as long as the medium employs a recording control method having control information.

Also, in the embodiments described above, the configuration in which a camera main unit is connected to a network through the terminal 2 is used. However, when the camera main unit has a structure having a network connection function, the camera main unit may be directly connected to a network.

Also, any means can be used for the physical means for connecting to a network. For example, wired connection such as USB, IEEE 1394, the Internet, etc., or wireless connection such as IEEE 802.11, Bluetooth, etc., may be used.

Also, the accidental-recording prevention means need not be a mechanical switch: it may be a flag, stored in the control area in the recording area of the medium or a memory register, indicating whether recording or erasure is prohibited.

According to the embodiments described above, recording and erasure of the data in the medium are prohibited at network connection time, and thus it becomes possible to prevent the data from being rewritten by the operation on the network, thereby protecting important data.

Also, in the network connection mode, the operation restriction on recording and erasure of the medium data is varied depending on whether the recording medium is a sequential-access recording medium or a random-access recording medium. Thus, it becomes possible to consider the difference in the recording method. For example, in a sequential-access recording medium, there is a possibility in that important data might be lost by important data being overwritten by new data, whereas in a random-access recording medium such as a memory card, there is little possibility of the same incident occurring. Therefore, it becomes possible to protect data without losing the convenience of the medium, for example, by not restricting the operation for a random-access recording medium more than necessary.

Also, by providing levels of restriction on the operations of recording and erasure in the network mode, it is possible to remove the restriction when it is necessary to allow free operation from the network rather than protecting data. Furthermore, priority is given to data protection in the initial state, and thus, for example, a beginner will not lose important data accidentally.

Thus, it becomes possible to protect data in the medium in accordance with the target usage of the main unit and the operator's learning level without losing usability.

Moreover, since level setting cannot be operated from a network, it becomes possible to protect data in the main unit from being operated by changing levels by an unknown third person.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-417378 filed Dec. 15, 2003, which is hereby incorporated by reference herein.

What is claimed is:

1. A recording/reproducing apparatus using a recording medium having accidental-recording prevention means capable of setting the medium to a recording-allowed state allowing recording or erasing and a recording-prohibited state prohibiting recording or erasing in order to prevent accidental recording or accidental erasure, the apparatus comprising:

recording/reproducing means for recording, reproducing, or erasing data on the recording medium;

switching means capable of switching between a network mode for transmitting and receiving image data through a network and a normal mode for recording and reproducing image data without connecting or accessing to a network; and control means for controlling the recording operation and erasing operation of the recording medium in accordance with the setting by the accidental-recording prevention means in the normal mode, and for prohibiting the recording operation of the recording medium and erasing operation of the recording medium regardless of whether the accidental-recording prevention means is in the recording-allowed state or the recording-prohibited state in the network mode.

2. The recording/reproducing apparatus according to claim 1, wherein the data is moving image data, still image data, or moving and still image data.

3. A recording/reproducing apparatus capable of attaching a first recording medium and a second recording medium both having accidental-recording prevention means for prohibiting accidental recording or accidental erasure, the apparatus comprising:

data control means for performing recording, reproducing, or erasing of data on the first and the second recording media;

mode selection means for allowing to switch between a network mode for transmitting and receiving image data through a network and a normal mode for recording and reproducing image data without connecting to a network; and control means for controlling the data control means in accordance with the mode selected by the mode selection means, wherein, in the network mode, the control means prohibits the data recording operation of the first recording medium regardless of whether the accidental-recording prevention means is in a recording-allowed state or in a recording-prohibited state, and prohibits the data erasing operation of the second recording medium regardless of whether the accidental-recording prevention means is in the recording-allowed state or in the recording-prohibited state.

4. The recording/reproducing apparatus according to claim 3, wherein the first recording medium is a sequential-access recording medium, and the second medium is a random-access recording medium.

5. A recording/reproducing apparatus capable of attaching a first recording medium and a second recording medium both having accidental-recording prevention means for prohibiting accidental recording or accidental erasure, the apparatus comprising:

data control means for performing recording, reproducing, or erasing of data on the first and the second recording media;

mode selection means for allowing to switch between a network mode for transmitting and receiving image data through a network and a normal mode for recording and reproducing image data without connecting to a network; and control means for controlling the data control means in accordance with the mode selected by the mode selection means, wherein, in the network mode, the control means controls the data control means in the following three levels:

a first operation level in which recording and erasing operations on the medium are allowed if the accidental-recording prevention means in the first recording medium and the second recording medium are in a recording-allowed state allowing recording or erasing of the medium, respectively;

a second operation level in which data recording operation is prohibited on the first recording medium regardless of whether the accidental-recording prevention means is in the recording-allowed state or the recording-prohibited state, and, if the accidental-recording prevention means is in the recording-allowed state, the accidental-recording prevention means allows the data recording operation on the second recording medium and prohibits the data erasing operation on the recording medium; and a third operation level in which the recording operation and erasing operation on the recording medium are prohibited regardless of whether the accidental-recording prevention means is in the recording-allowed state or the recording-prohibited state in the network mode both for the first recording medium and the second recording medium.

6. The recording/reproducing apparatus according to claim 5, wherein an operator can select any one of the first, the second, and the third operation levels.

7. The recording/reproducing apparatus according to claim 5, wherein the selection of an operation level is prohibited to be switched from a terminal on the network, and is only allowed to be switched by the operation on a main unit.

8. The recording/reproducing apparatus according to claim 5, wherein the data control means has file control means for performing recording, reproducing, and erasing of data on a recording area on the recording medium.

* * * * *